United States Patent
Bernardini et al.

(12) 
(10) Patent No.: US 6,694,733 B1
(45) Date of Patent: Feb. 24, 2004

(54) TURBOCHARGER WITH SLIDING BLADES HAVING COMBINED DYNAMIC SURFACES AND HEAT SCREEN AND UNCOUPLED AXIAL ACTUATING DEVICE

(75) Inventors: Luciano Labindo Bernardini, Uxegney (FR); Alain Rene Lombard, Uxegney (FR); Jean-Luc Hubert Perrin, Girmont (FR); Eric Joseph Viola, Epinal (FR)

(73) Assignee: Honeywell Garrett SA, Thaon-les-Vosges (FR)

( * ) Notice: Subject to any disclaimer, the term of this patent is extended or adjusted under 35 U.S.C. 154(b) by 0 days.

(21) Appl. No.: 10/181,224
(22) PCT Filed: Jan. 14, 2000
(86) PCT No.: PCT/FR00/00066
§ 371 (c)(1),
(2), (4) Date: Nov. 5, 2002
(87) PCT Pub. No.: WO01/53679
PCT Pub. Date: Jul. 26, 2001

(51) Int. Cl.[7] .................. F02D 23/00; F01B 25/02; F02C 6/12; F01D 17/14
(52) U.S. Cl. .................. 60/602; 415/157; 415/158; 417/407
(58) Field of Search ............... 60/602; 415/157, 415/158; 417/407

(56) References Cited

U.S. PATENT DOCUMENTS

| | | | | |
|---|---|---|---|---|
| 2,918,207 A | | 12/1959 | Moore | 417/407 |
| 5,214,920 A | * | 6/1993 | Leavesley | 60/602 |
| 5,231,831 A | * | 8/1993 | Leavesley | 60/602 |
| 5,441,383 A | * | 8/1995 | Dale et al. | 415/158 |
| 6,158,956 A | * | 12/2000 | Arnold | 415/158 |

FOREIGN PATENT DOCUMENTS

| | | |
|---|---|---|
| EP | 0 678 657 | 10/1995 |
| GB | 2 271 814 | 4/1994 |

* cited by examiner

*Primary Examiner*—Sheldon J. Richter
(74) *Attorney, Agent, or Firm*—Young & Thompson

(57) ABSTRACT

A turbocharger having a variable geometry turbine intake incorporating a mobile cylindrical piston (70) for varying the area of the induction nozzle in the turbine (18). Blades (90) mounted on the piston for controlling the flow in the nozzle penetrate through a slotted heat shield (92) having a central opening wherein the rear disc of the turbine wheel is embedded to provide a smooth aerodynamic flow in the turbine vanes. A shield (100) engaged between the heat screen and a central housing of the turbocharger prevents the gas from the rear disc cavity from recycling into the cavity housing the blades further enhancing the aerodynamic flow. An axial actuating device (77) is secured for operating the piston via a shaft coupled by a cross (72) to the piston and coupled to an actuating hub (118) in the actuating device by quick connect unthreaded connection (122).

7 Claims, 5 Drawing Sheets

US 6,694,733 B1

TURBOCHARGER WITH SLIDING BLADES HAVING COMBINED DYNAMIC SURFACES AND HEAT SCREEN AND UNCOUPLED AXIAL ACTUATING DEVICE

BACKGROUND OF THE INVENTION

1. Field of the Invention

The present invention relates generally to turbochargers with variable geometry. More particularly a turbocharger is provided having a turbine intake with a variable nozzle with sliding blades, with the blades entering via a heat screen of slotted sheet metal suspended in the housing of the turbine and having the turbine wheel embedded therein in order to provide an aerodynamic surface directing the flow of exhaust gas in a turbine wheel with a substantially complete rear disc, an aerodynamic shield and an uncoupled axial actuating device to facilitate mounting.

2. Description of the Related Art

High-output turbochargers use variable-geometry systems for the turbine nozzle intakes in order to increase the performance and aerodynamic yield. Variable-geometry systems for turbochargers have typically been of two types: a type with rotating blades and a type with a piston. The rotating blade type exemplified in U.S. Pat. No. 5,947,681, entitled PRESSURE BALANCED DUAL AXLE VARIABLE NOZZLE TURBOCHARGER provides a plurality of individual blades placed in the intake nozzle of the turbine, which can turn in order to reduce or increase the area of the nozzle and the flow volume. The piston type, which is exemplified in U.S. Pat. Nos. 5,214,920 and 5,231,831 both entitled TURBOCHARGER APPARATUS, and U.S. Pat. No. 5,441,383 entitled VARIABLE EXHAUST DRIVEN TURBOCHARGERS uses a piston or a cylindrical wall which can be displaced concentric to the axis of rotation of the turbine in order to reduce the intake area of the nozzle. In most cases the variable-geometry turbocharger of the piston type includes blades with a leading edge which is fixed with respect to the flow of air, which are either mounted on the piston or on a stationary nozzle wall facing the piston and which enter into slots in the opposite surface during displacement of the piston.

In variable-geometry, piston-type turbochargers of the prior art the challenge has been to maximise the aerodynamic performance balanced by the tolerancing of the contact surfaces, principally of the blades and the reception slots which are subjected to an extreme temperature variation and to mechanical stress, as well as to provide a means for actuating the piston according to a configuration which can be easily manufactured.

SUMMARY OF THE INVENTION

A turbocharger incorporating the present invention has a casing having a turbine housing receiving exhaust gas from an exhaust head of an internal combustion engine at an intake and having an exhaust outlet, a compressor housing having an air intake and a first volute, and a central housing between the turbine housing and the compressor housing. A turbine wheel is mounted in the turbine housing to extract the energy from the exhaust gas. The turbine wheel is connected to a shaft which extends from the turbine housing through a shaft bore in the central housing and the turbine wheel has a substantially complete rear disc and multiple vanes. A bearing mounted in the shaft bore of the central housing supports the shaft for rotational movement and a vane wheel is connected to the shaft facing the turbine wheel and enclosed in the compressor housing.

A substantially cylindrical piston is concentric to the turbine wheel and can be displaced parallel to an axis of rotation of the turbine wheel. A plurality of blades extend substantially parallel to the axis of rotation from a first end of the piston in the proximity of the rear disc. A heat screen is engaged at its external circumference between the turbine housing and the central housing and extends radially inwards towards the axis of rotation. The rear disc of the turbine wheel is embedded in the heat screen for the smooth flow of exhaust gas in the vanes. The heat screen also has a plurality of slots receiving the blades. An actuating device is provided to displace the piston from a first position in which the first end is in the proximity of the heat screen to a second position in which the first end is remote from the heat screen.

BRIEF DESCRIPTION OF THE DRAWINGS

The details and features of the present invention will be better understood in relation to the detailed description and the drawings in which.

DETAILED DESCRIPTION OF THE INVENTION

Figure 1:
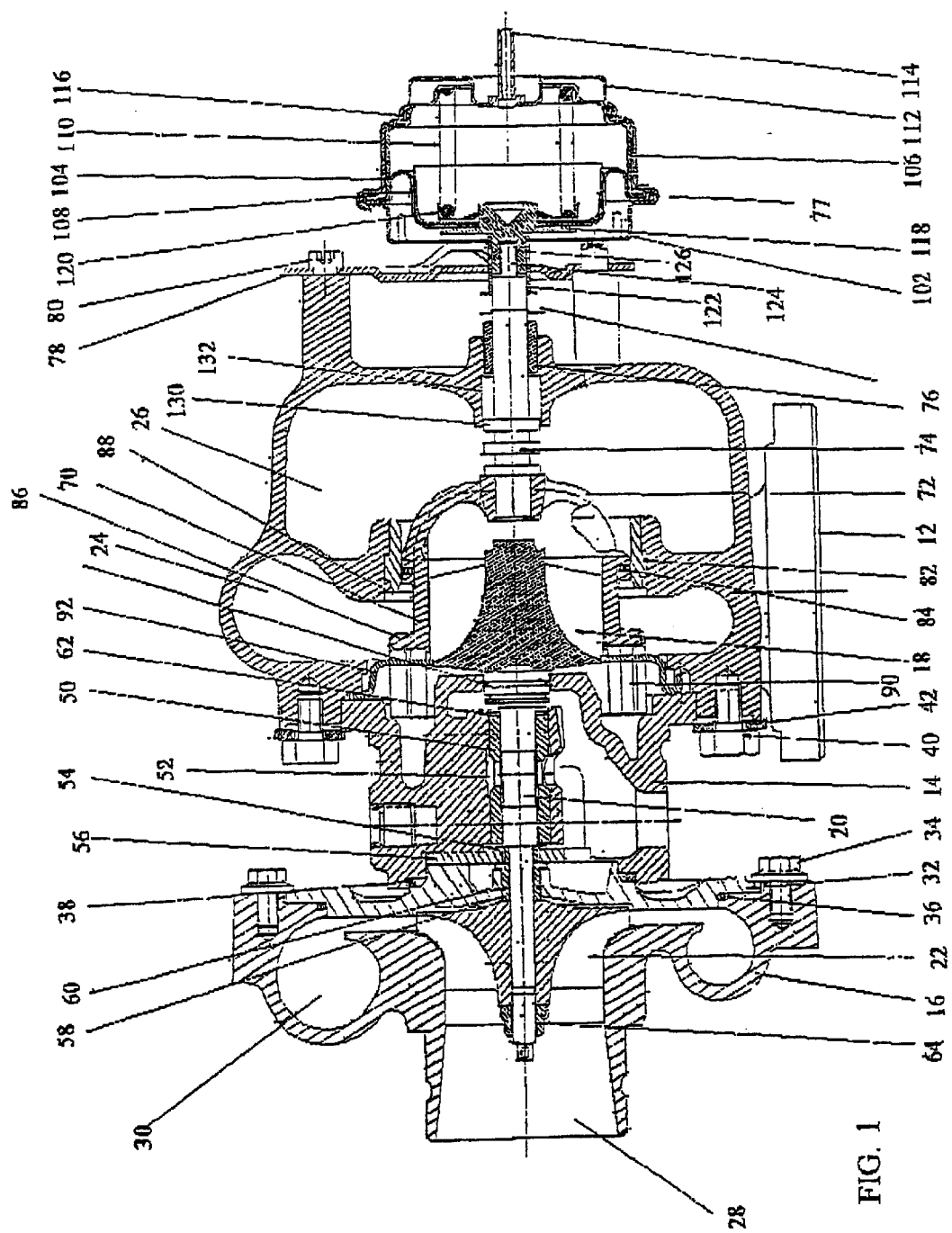
FIG. 1 is an elevation in transverse cross-section of a turbocharger using an embodiment of the invention.

In the drawings FIG. 1 shows an embodiment of the invention for a turbocharger 10 which includes a turbine housing 12, a central housing 14 and a compressor housing 16. A turbine wheel 18 is connected by the shaft 20 to an impeller 22. The turbine wheel converts the energy of the exhaust gas of an internal combustion engine provided with an exhaust head (not shown) with a volute 24 in the turbine housing. The exhaust gas is expanded through the turbine and exits from the turbine housing via the outlet 26.

The compressor housing includes an intake 28 and an outlet volute 30. A rear plate 32 is connected by bolts 34 to the compressor housing. The rear plate is, in turn, fixed to the central housing by means of bolts (not shown). A first annular seal 36 is engaged between the rear plate and the compressor housing and a second annular seal 38 is engaged between the rear plate and the central housing. Bolts 40 and fixing washers 42 connect the turbine housing to the central housing.

Journal bearings 50 mounted in the shaft bore 52 of the central housing support the shaft during rotation. A clamping collar 54 mounted on the shaft adjacent to the impeller engages an abutment bearing 56 forced between the central housing and the rear plate in the illustrated embodiment. A sleeve 58 is engaged between the clamping collar and the impeller. A rotational seal 60, such as a piston segment, provides a seal between the sleeve and the rear plate. A circlip 62 urges the journal bearing into the bore and a nut 64 urges the impeller and the bearing components onto the shaft.

The variable-geometry mechanism of the present invention includes a substantially cylindrical piston 70 moving into the turbine housing which is concentrically aligned on the rotational axis of the turbine. The piston can be displaced longitudinally by means of a cross-piece 72, having three branches in the illustrated embodiment, being attached to the piston and being attached to an actuating shaft 74. The actuating shaft enters a bushing 76 extending through the turbine housing and is connected to an actuating device 77. In the illustrated embodiment the actuating device is mounted on projections on the turbine housing using a support 78 and bolts 80.

The piston slides in the turbine housing by means of a low-friction attached piece 82. A cylindrical seal 84 is inserted between the piston and the attached piece. The piston can be displaced from a closed position illustrated in FIG. 1, substantially reducing the area of the intake nozzle which extends from the volute 24 to the turbine. In the fully open position, a radial projection 86 on the piston enters a recess 88 which defines the course of the piston.

The blades 90 of the nozzle extend from the radial projection on the piston. When the piston is in the closed position the blades are housed in a recessed portion of the moulded piece of the central housing. A heat screen 92 is engaged between the turbine housing and the central housing. The screen is of a suitable shape to extend into the cavity of the turbine housing from the interface between the central housing and the turbine housing and to provide a wall inside the intake nozzle of the turbine. The turbine wheel includes a substantially complete rear disc and a central orifice 94 (best seen in FIGS. 2 and 3 as described hereinunder) in the screen receives the rear disc of the turbine wheel in an embedded manner in order to provide a substantially smooth aerodynamic trajectory from the outlet of the volute of the turbine housing to the turbine wheel.

Figure 2:
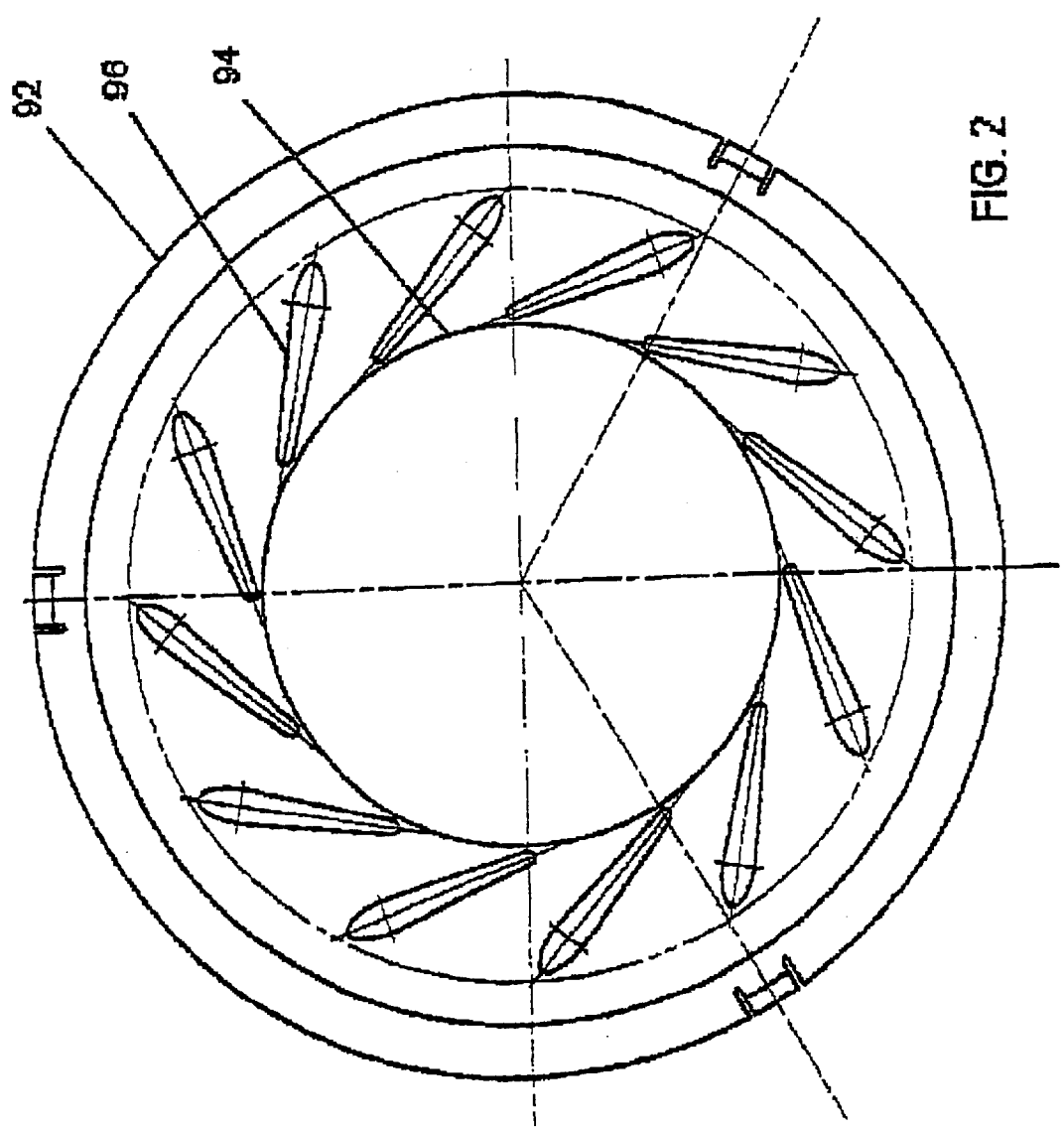
FIG. 2 is a top view of a first embodiment of the heat screen.

FIG. 2 shows a first embodiment of the heat screen including closed slots 96 to receive the blades 90. The circumference of the orifice 94, in which the rear disc of the turbine wheel is embedded, is inside the portion of the profiles of the slots housing the rear edge of the blades. This embodiment provides an optimal aerodynamic profile but the production constraints and the tolerances between the slots and the blades may prevent effective use of this embodiment in some applications.

Figure 3:
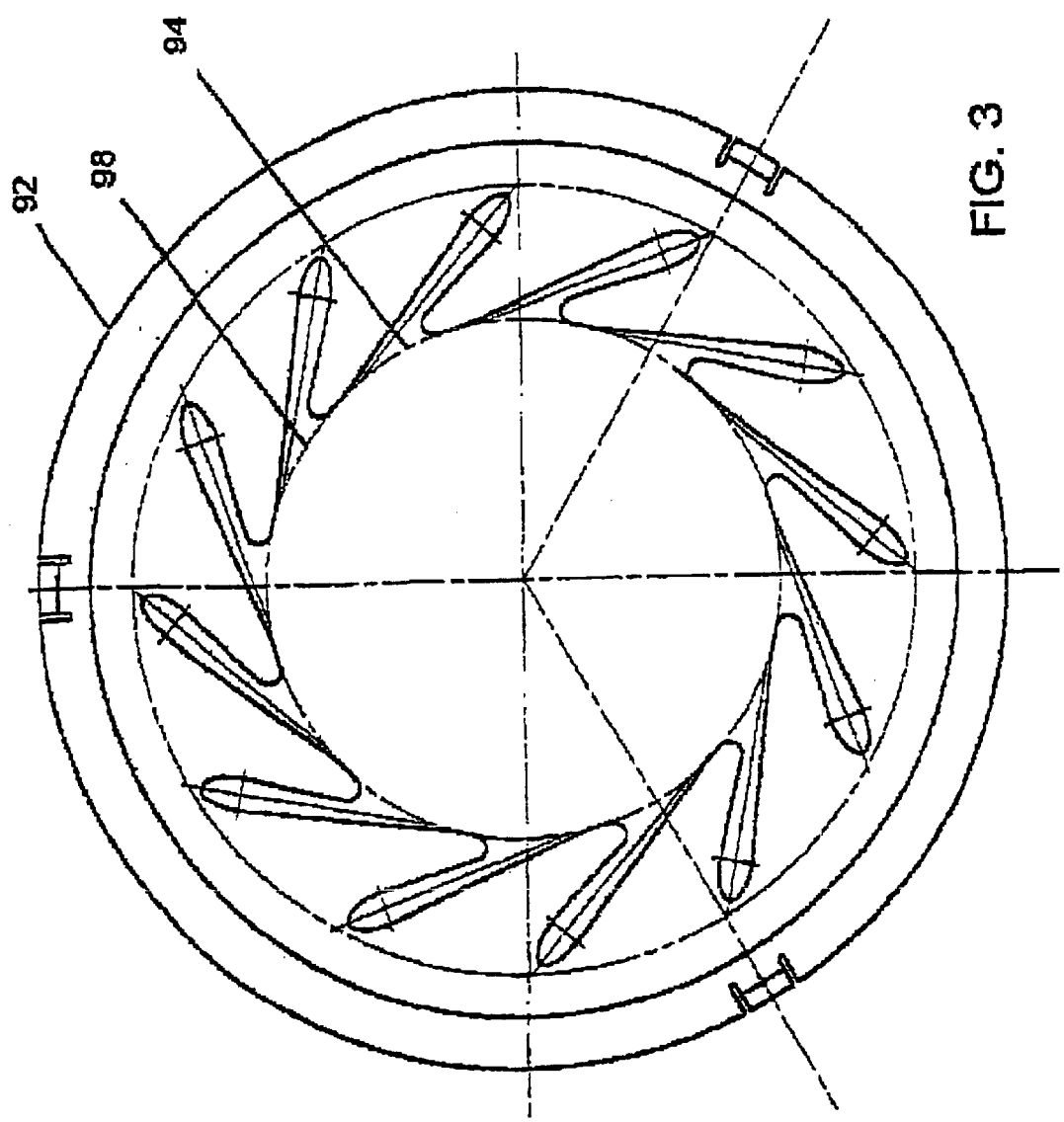
FIG. 3 is a top view of a second embodiment of the heat screen.

FIG. 3 shows a second embodiment of the heat screen which provides an open profile at the rear edge of the slots, adjacent to the central orifice in order to reduce, to some extent, the tolerance requirements of these slots. The profile of the slots extends along and beyond the external surface of the vanes substantially as far as the diameter of the rear disc of the turbine wheel but the profile along the internal surface of the blade ends by leaving an orifice, generally designated 98, joining the slot to the central orifice. In both embodiments, the fact of embedding the eccentricity of the hub of the turbine wheel and the rear disc in the central orifice minimises the clearance and the blade-free space between the rear edges of the blades and the diameter of the peak of the turbine blades of the turbine wheel.

Figure 4:
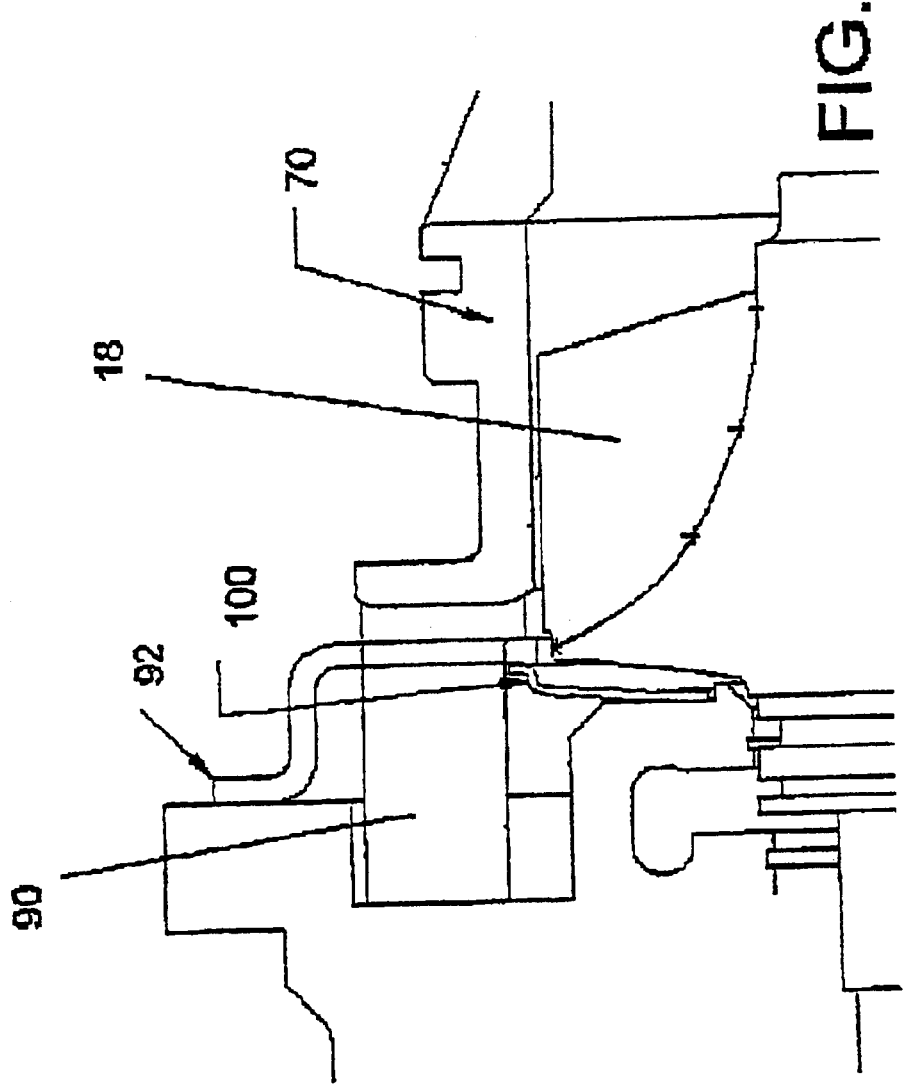
FIG. 4 is an elevation in transverse cross-section of an embodiment of the invention with an aerodynamic shield in association with the heat screen.

FIG. 4 shows an aerodynamic shield 100 engaged between the heat screen and the central housing. The shield prevents the recirculation of exhaust gas leaks from the cavity of the rear disc of the turbine wheel into the recess in the central housing which houses the blades when the piston is in the closed position. Preventing the recirculation from the cavity of the rear disc encourages a smooth flow from the intake nozzle into the vanes of the turbine wheel. In the illustrated embodiment the shield is fixed between the heat screen and the central housing by the action of a spring comparable to a domed elastic washer.

The system for actuation of the piston in the embodiment illustrated in the drawings is a pneumatic actuating device 77 having a casing base 102 fixed to a support 78 as illustrated in FIG. 1. As shown in FIG. 1 and in more detail in the exploded view of FIG. 5 a diaphragm 104 is engaged between the casing base and a cover 106. A spring plate 108 in combination with the cover urges a spring 110 for the purpose of restoring the force on the diaphragm. The cover is held in position by an actuating device cap 112 which contains a vacuum intake 114 for actuation purposes. A seal 116 is provided between the cap and the cover.

An actuating hub 118 is fixed to the diaphragm by an elastic washer 120 which also acts as a plate for the spring 110. The actuating hub is connected to the shaft by a quick-connect connection 122 which will be described in more detail hereinunder. A small-diameter centring connection 124 on the shaft enters a counter bore 126 in the hub.

As shown in FIG. 1 the linear displacement of the shaft is utilised by diametral extensions 130 on the shaft which slidingly enter a bore 132 in the turbine housing. In some embodiments a deflector 134 is mounted around the shaft in order to divert leaks of gas via the bushing 76 and get them away from the actuating device.

Figure 6:
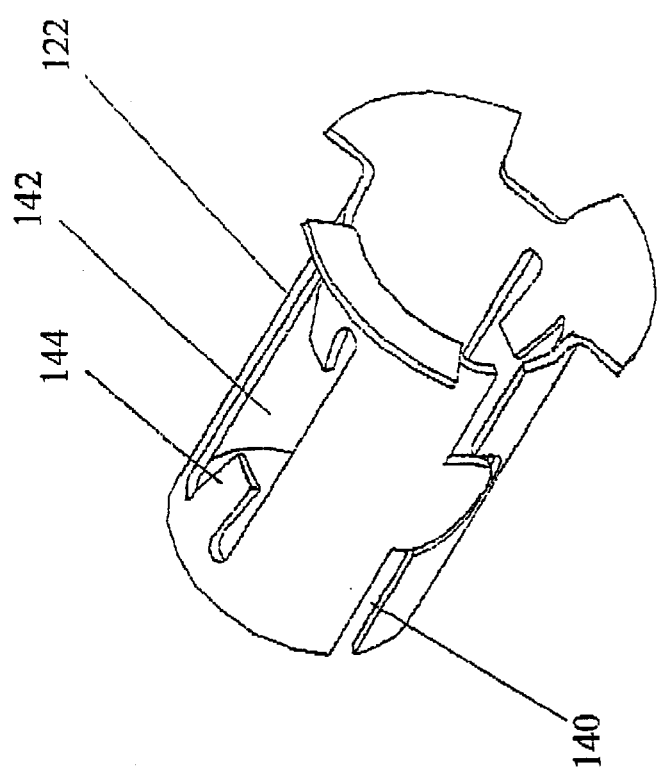
FIG. 6 is a detailed view of the quick-connect connection between the swivel pipe connector and the diaphragm assembly.
Figure 5:
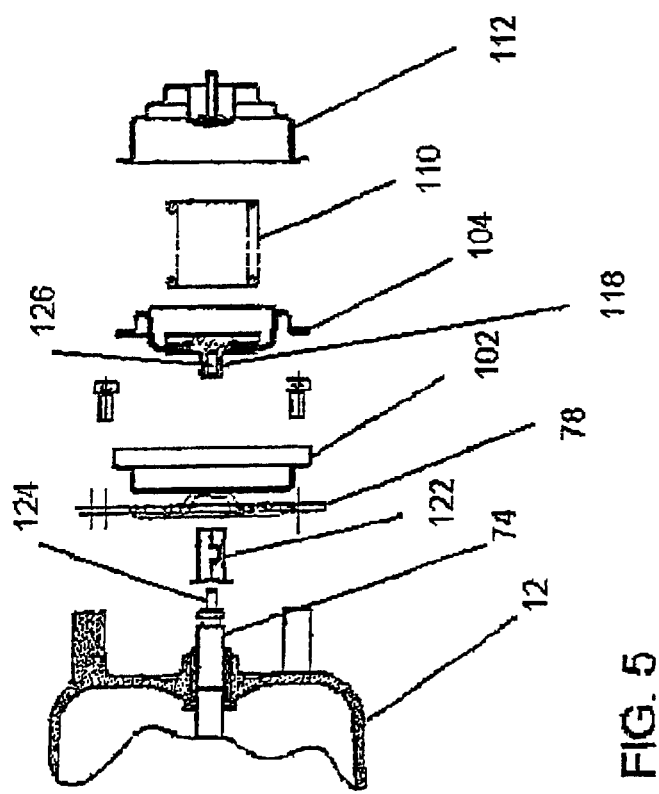
FIG. 5 is an exploded view of the actuating device.

The quick-connect connection illustrated in detail in FIGS. 5 and 6 is made of sheet metal shaped in to a substantially cylindrical shape with a longitudinal slot 140. Oppositely positioned cut-outs 142 in the wall of the cylinder provide clearance for tongues 144 which are lowered into the cylinder. A first set of tongues is adapted to engage in a slot 146 in the shaft while a second set of tongues is adapted to engage in a slot 148 in the actuating hub. The elasticity of the sheet metal tongues and of the slotted cylinder permits insertion of the shaft and of the hub into the quick-connect connection by the instant engagement of the tongues in the slots, thus overcoming the need for any threaded connection between the shaft and the hub. The alignment connection and the core in the hub maintain the axial alignment of the assembly.

An additional advantage of the quick-connect configuration is the possibility of removing the actuating device from the turbocharger without significant disassembly and—even more importantly—in most mounting configurations, without removing the turbocharger from the vehicle. The support 78 is loosened from the turbine housing and a compression tool is used to remove the tongues from the slots and to permit the shaft and/or the hub to be withdrawn from the quick-connect connection.

An alternative embodiment for the quick-connect connection is a star-shaped spring washer which is wedged in a cut-out in the actuating hub. By inserting the shaft into the hub, the star-shaped spring washer engages a shoulder on the shaft. A circumferential edge of the cut-out is crimped to fix the star-shaped spring washer in the cut-out. The second embodiment allows for reduced length over the overall coupling.

Having described the invention in detail as required by the law of industrial property, those skilled in the art will see modifications and substitutions which can be made to the specific embodiments disclosed herein. Such modifications and substitutions are within the scope and intention of the present invention as defined in the following claims.

What is claimed is:

1. A turbocharger (10) comprising:
    a casing having a turbine housing (12) receiving exhaust gas from an exhaust head of an internal combustion engine at an intake and having an exhaust outlet, a compressor housing (16) having an air intake and a first volute, and a central housing (14) between the turbine housing (12) and the compressor housing (16);

a turbine wheel (18) mounted in the turbine housing (12) and extracting the energy from the exhaust gas, the said turbine wheel (18) connected to a shaft (20) extending from the turbine housing (12) through a shaft bore (52) in the central housing (14) and the said turbine wheel (18) having a rear disc and multiple vanes;

a bearing (50) mounted in the shaft bore (52) of the central housing (14), the said bearing supporting the shaft (20) for rotational movement;

a vane wheel (22) connected to the said shaft (20) facing the turbine wheel (18) and enclosed in the compressor housing (16);

a substantially cylindrical piston (70), concentric to the turbine wheel (18) and able to be displaced parallel to an axis of rotation of the turbine wheel (18);

a plurality of blades (90) extending substantially parallel to the axis of rotation from a first end of the piston in the proximity of the rear disc;

a heat screen (92) engaged at its external circumference between the turbine housing (12) and the central housing (14) and extending radially inwards towards the axis of rotation, the rear disc of the turbine wheel housed in the heat screen (92) for the smooth flow of the exhaust gas in the vanes, the said heat screen (92) also having a plurality of slots (96) receiving the blades (90); and means (77) for displacing the piston (70) from a first position in which the first end is in the proximity of the heat screen to a second position in which the first end is remote from the heat screen, further characterised by:

an aerodynamic shield (100) located between the rear disc of the turbine wheel (18) and the central housing (14) and having an external circumferential portion engaging an internal circumferential portion of the heat screen (100), the said aerodynamic shield having an internal circumferential portion engaging the central housing (14) in the proximity of the shaft bore.

2. Turbocharger as defined in claim 1, wherein the heat screen (92) has a central orifice in which the rear disc is embedded and wherein the plurality of slots in the heat screen (92) each have a closed rear edge in the proximity of the central orifice.

3. Turbocharger as defined in claim 1, wherein the heat screen (92) has a central orifice in which the rear disc is embedded and wherein the plurality of slots of the heat screen (92) each have a profile extending beyond an external surface of the associated blade substantially as far as the diameter of the central orifice, the said profile extending along an internal surface of the associated blade ending at the central orifice leaving an orifice at the rear edge connecting to the central orifice.

4. Turbocharger as defined in claim 1, wherein the means for displacing the piston comprise;

a cross-piece (72) having a plurality of branches attached to the piston, the said branches converging towards an actuating shaft concentric to the axis of rotation;

an actuating device (77) having an actuating hub (118); and a quick-connect connection means (122) to connect the actuating shaft and the actuating hub.

5. Turbocharger as defined in claim 4, wherein the actuating device is a pneumatic actuating device having a diaphragm connected to the actuating hub (118).

6. Turbocharger as defined in claim 4, wherein the quick-connect connection means has a cylinder made of sheet metal having a longitudinal slot (140) and at least one pair of elastic tongues (144) spaced apart in an opposite longitudinal orientation along the cylinder and extending into it, one of the pair of tongues being adapted to engage a circumferential slot (146) in the actuating shaft and the second of the pair of tongues being adapted to engage a circumferential slot (148) in the actuating hub (118).

7. Turbocharger as defined in claim 6, wherein the actuating hub (118) includes a counter bore (126) adapted to receive, in a close-fitting manner, an alignment connection (124) extending from the actuating shaft.

* * * * *